United States Patent [19]

Morgenstern et al.

[11] Patent Number: 5,393,249
[45] Date of Patent: Feb. 28, 1995

[54] REAR CROSS CONNECT DSX SYSTEM

[75] Inventors: Todd A. Morgenstern, Bloomington; James D. Dewey, Plymouth, both of Minn.

[73] Assignee: ADC Telecommunications, Inc., Minneapolis, Minn.

[21] Appl. No.: 85,343

[22] Filed: Jun. 30, 1993

[51] Int. Cl.⁶ .............................................. H01R 9/07
[52] U.S. Cl. ...................................... 439/668; 439/76; 439/490
[58] Field of Search ............... 439/668, 669, 578, 585, 439/55, 76, 79, 62, 59, 49

[56] References Cited

U.S. PATENT DOCUMENTS

| | | |
|---|---|---|
| 3,740,699 | 6/1989 | Johnson et al. |
| 4,650,933 | 3/1987 | Benda et al. ..................... 439/669 |
| 4,770,639 | 9/1988 | Lau ..................................... 439/668 |
| 4,797,114 | 1/1989 | Lau ..................................... 439/668 |
| 4,840,568 | 6/1989 | Burroughs et al. ................ 439/49 |

FOREIGN PATENT DOCUMENTS 1549201  8/1979  United Kingdom .

Primary Examiner—David L. Pirlot
Attorney, Agent, or Firm—Merchant, Gould, Smith, Edell, Welter & Schmidt

[57] ABSTRACT

A jack assembly is disclosed including a jack having a means for releasable attachment to a mount. The jack further includes a body with means for connection to jack plugs and a circuit board having a plurality of contact points disposed on the first and second sides of the circuit board. Also included is a mount having a plurality of exposed contact members arranged in a predetermined array so that when the jack is inserted into the mount each electric contact point is in electrical communication with a discrete member of the contact members on the mount.

3 Claims, 5 Drawing Sheets

REAR CROSS CONNECT DSX SYSTEM

BACKGROUND OF THE INVENTION

A digital cross-connect system (DSX) provides a location for interconnecting two digital transmission paths. The apparatus for a DSX is located in one or more frames, or bays, usually in a telephone central office. The DSX apparatus also provides jack access to the transmission paths.

DSX jacks are well-known and include a plurality of spring contacts for receiving tip and ring plugs. The jacks are commonly ganged in a common housing which is mounted on the frame. The jacks are typically hard wired to wire termination pins which are mounted on a side of the housing opposite plug access openings.

The DSX of the prior art provided for improved operator access, and capabilities to provide for significant electronics. More specifically, commonly assigned U.S. Pat. No. 4,840,568 provided that the hard wired DSX signals are connected to a mount, within which the jack is inserted. The jack has a plurality of electrical contacts which can access these signals. However, the cross connect signals are hard wired to the opposite side of the jack itself. Having the cross connect signals hard wired to the jack makes removal of the jack contingent upon disconnecting the hard wired cross connect signals from the jack. The present invention provides for a jack and mount arrangement in which this problem is solved.

SUMMARY OF THE INVENTION

According to a preferred embodiment of the present invention an apparatus is disclosed for providing access to a plurality of telecommunication lines. The apparatus includes a mount which includes a plurality of electric contacts hard wired to a source of DSX signals, and cross connect signals. A plurality of jacks are provided to be releasably attached to the mount points. Each jack includes a plurality of electric contact points designed to engage the electric contacts of the mount to receive the DSX signals and cross connector signals when the jack is inserted in the mount.

DETAILED DESCRIPTION OF THE PREFERRED EMBODIMENT

Referring now to the several FIGURES in which identical elements are numbered identically throughout, a description of the preferred embodiment of the present invention will now be provided.

Figure 1A:
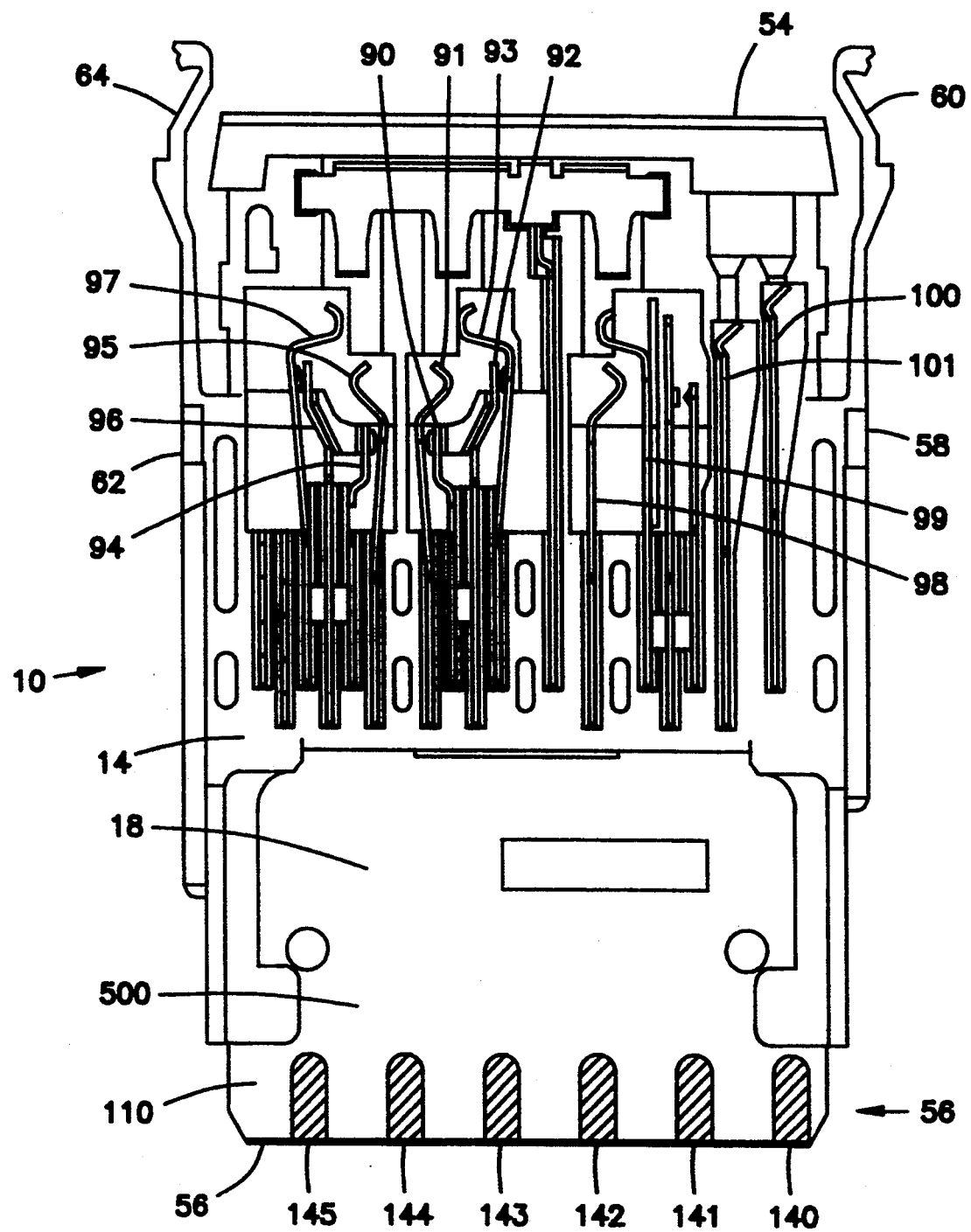
FIG. 1A is a cut-away side elevation view of a jack.

With initial reference to FIG. 1A, there is generally shown a jack 10. The jack 10 includes a dielectric body 14 and a printed circuit board 18. The jack 10 extends from a leading edge 54 of body 14 to a trailing edge 56 of circuit board 18. An upper edge 58 of body 14 is provided with an axially extending rail 60. A lower edge 62 of body 14 is provided with a lower rail 64, similar in structure to that of rail 60.

The upper and lower rails, 60 and 64, are designed to releasably secure the jack 10 within a mount 20 in tile same fashion as that disclosed in commonly assigned U.S. Pat. No. 4,840,568. The mount 20 will be described in detail later.

Figure 2:
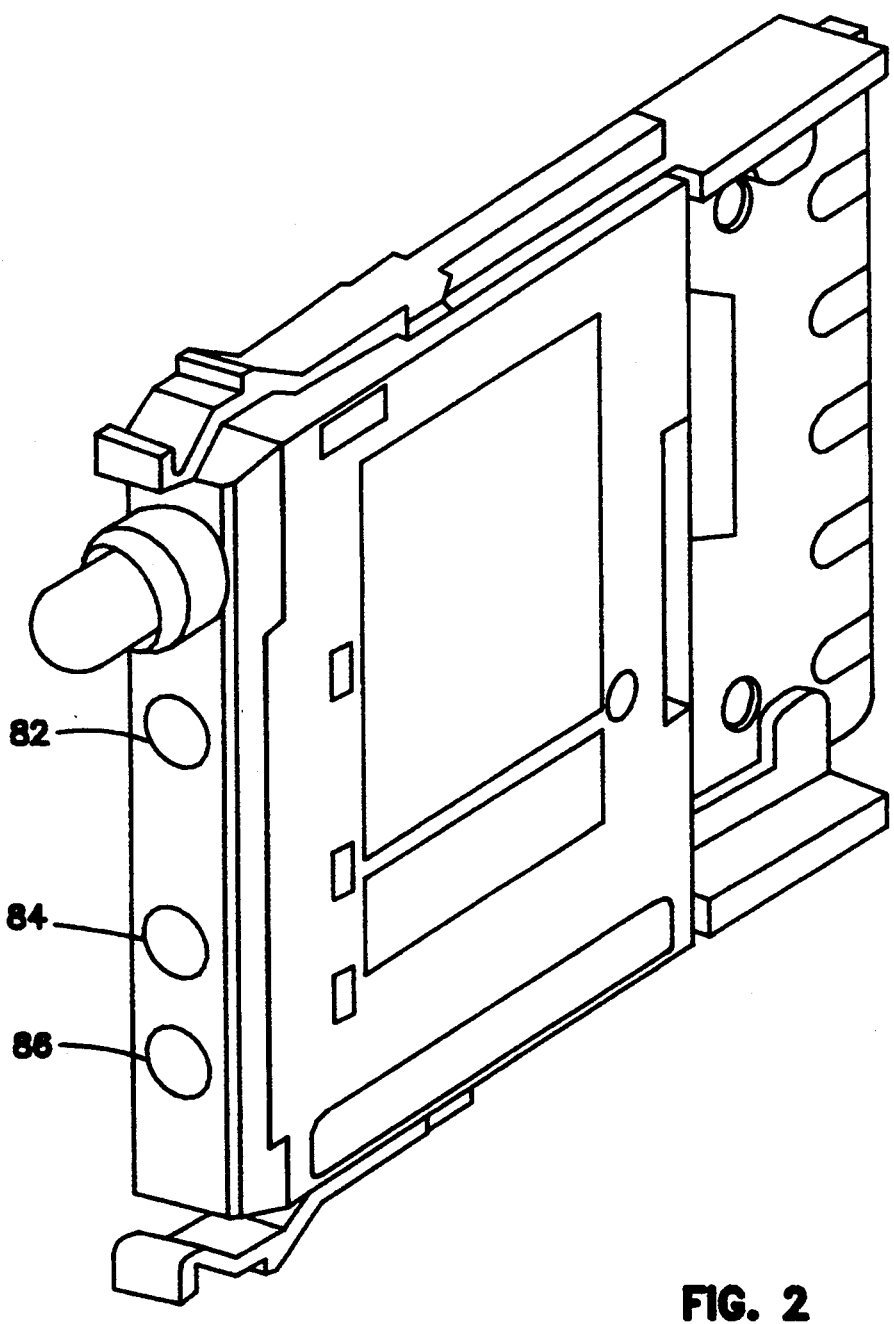
FIG. 2 is a perspective view of a jack.

As seen in FIG. 2, leading edge 54 of jack 10 is provided with a plurality of holes or ports extending therethrough. The plurality of ports include a monitor (or MON) port 82, an OUT port 84, and an IN port 86. These ports provide access for jack plugs (not shown) to be inserted into the jack 10. When inserted the jack plugs (not shown) access electric circuitry, through a plurality of spring contacts shown in FIG. 1A.

The spring contacts are located within the body 14 of the jack 10. As best seen in FIG. 1A, the plurality of spring contacts includes an OUT tip normal spring 90 and an OUT tip spring 91. The plurality also includes an OUT ring normal spring 92 and an OUT ring spring 93, an IN tip normal spring 94 and an IN tip spring 95. The plurality also includes an IN ring normal spring 96 and an IN spring 97, a monitor tip spring 98, and a monitor spring 99, a first LED spring 100 and a second LED spring 101. Springs 91 and 93 are disposed to be engaged by the tip and ring, respectively, of an electrical jack plug, not shown, inserted within the OUT port 84. Springs 95, 97 are selected to be engaged by the tip and ring of a plug, not shown, inserted within the IN port 86. Similarly springs 98, 99 are disposed to be engaged by the tip and ring of a plug, not shown, inserted within the MON port 82. Spring pairs 90–91, 92–93, 94–95, and 96–97 are in normal contact in the absence of a plug within either ports 84 and 86, and will be opened by insertion of a plug, not shown. Springs 98, 99 are connected across a resistance to springs 91 and 93. The arrangement of these contacts in the body of the jack 10 is similar as that described in commonly assigned U.S. Pat. No. 4,840,568.

Figure 1B:
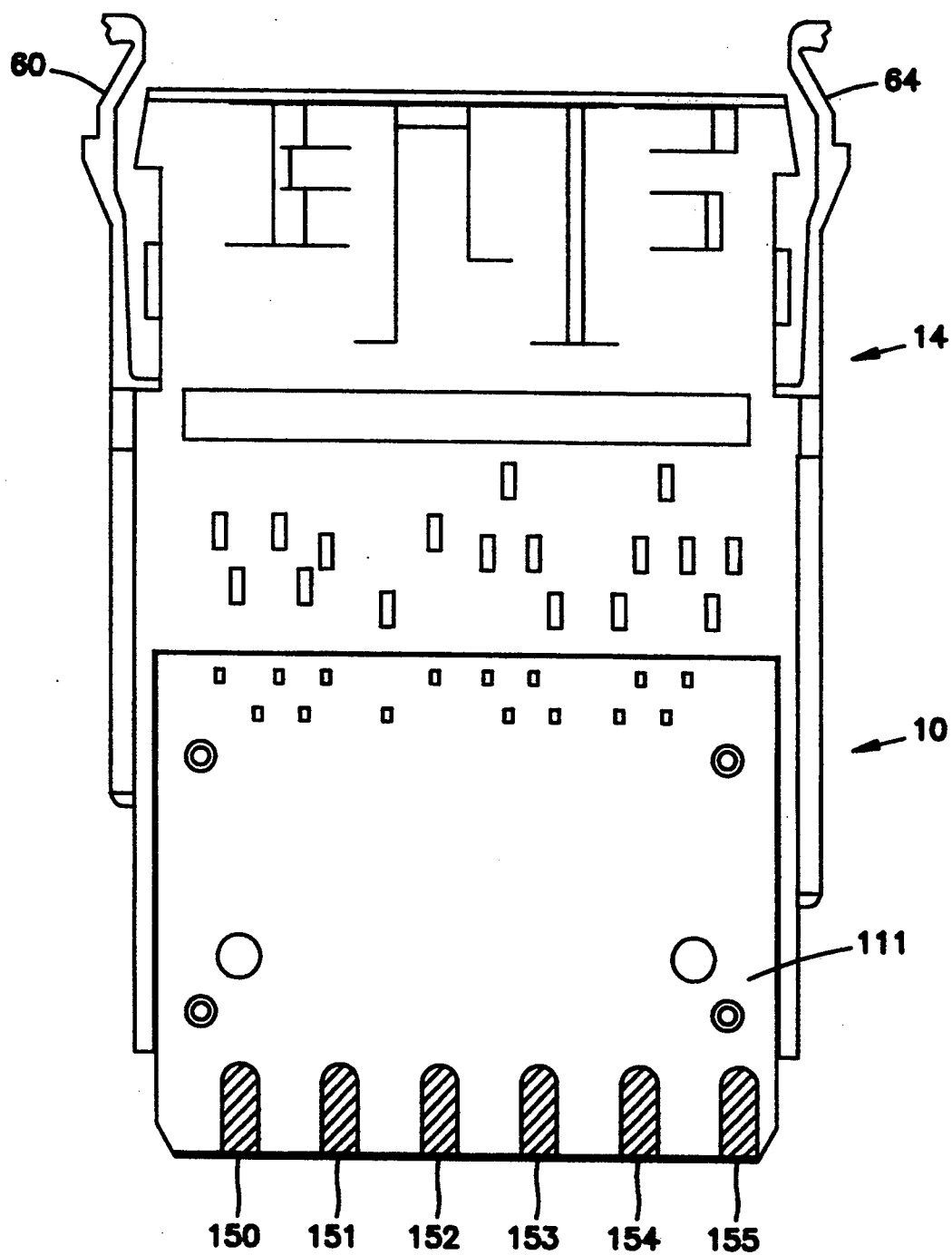
FIG. 1B is an opposite side view of the jack of FIG. 1A.

As seen in FIGS. 1A and 1B, the circuit board 18 of jack 10 includes a first side 110 and a second side 111. The size of the circuit board is defined by the upper and lower rails 60, 64 of the jack 10 for board 18 to stay within an area bounded by the rails 60, 64.

The circuit board 18 is of standard construction. The trailing edge 56 of the circuit board 18 has a plurality of electric contact points 140–145 and 150–155 disposed on the first and second sides of the circuit board 18 proximate to the trailing edge 56. The electrical contact points 140–145 are evenly spaced on the first side 110 of the circuit board 18. The electrical contact points 150–155 are evenly spaced in an alternate arrangement (i.e., staggered with respect to contact points 140–145) on the second side 111 of circuit board 18, as best illustrated by the position of contacts 220–231 shown in FIG. 3. This alternate spacing provides that no electric contact point on the first side 110 of circuit board 18 is immediately adjacent to an electric contact point on the second side 111 of the circuit board 18. Each electric contact point receives a independent signal when connected within the mount. Because an additional amount of electric contact points can be disposed on the circuit board, the signals received include the IN cross connect signal and the OUT cross connect signal.

The electric contact points 140–145, 150–155 alternately disposed on the first and second sides, 110, 111 of the circuit board are electrically connected to a plurality of circuit paths (not shown) connecting each contact point with individual ones of the spring contacts. The electric contact points 140–145, 150–155 are designed to connect to electric contacts disposed in the mount 20 as will be described.

Figure 3:
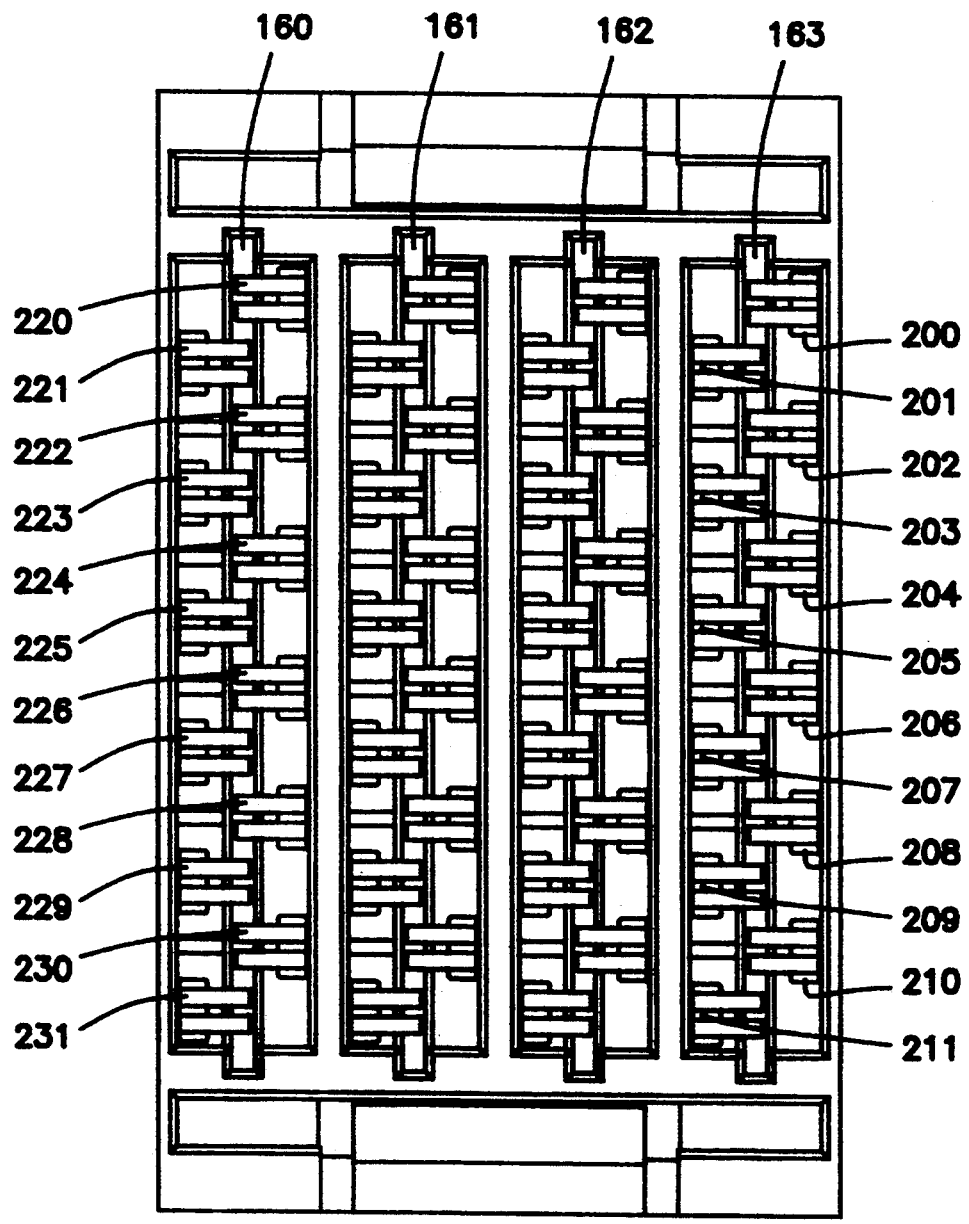
FIG. 3 is a front elevation view of a mount.
Figure 4:
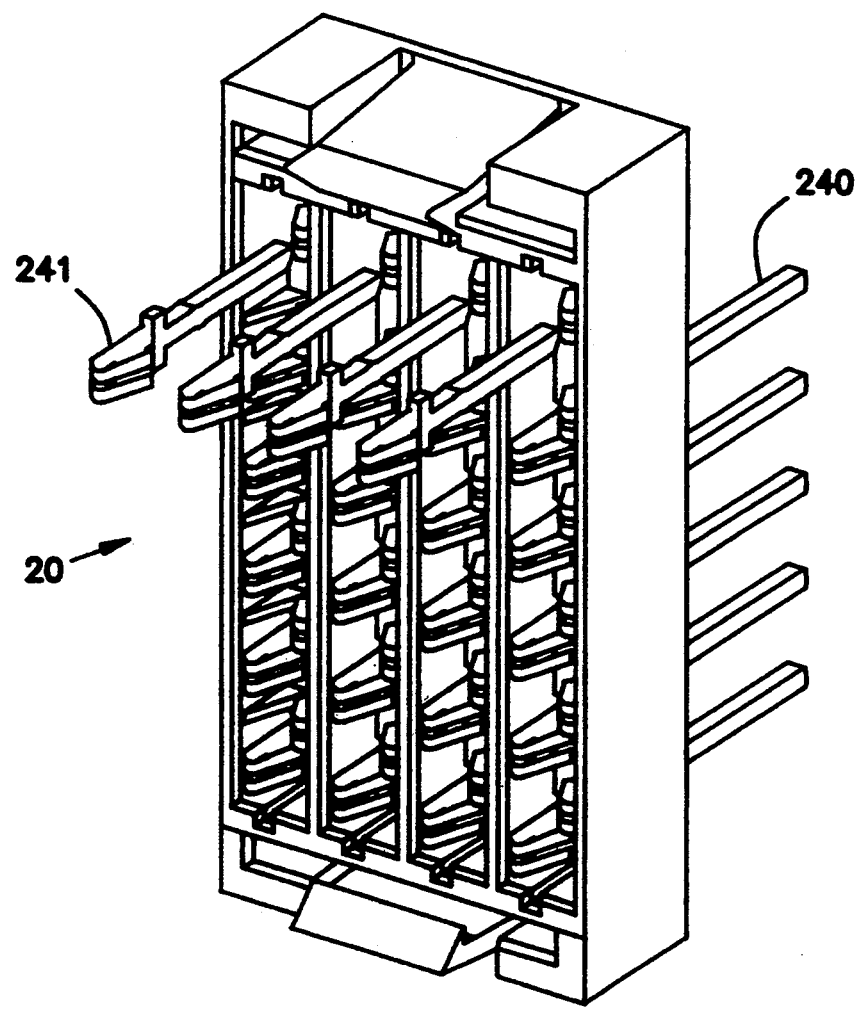
FIG. 4 is a perspective view of a mount.

Referring to FIGS. 3 and 4, the mount 20 of the present invention is of the same general configuration as that described in commonly assigned U.S. Pat. No. 4,840,568. In addition to containing means to releasably secure the jack 10 within the mount 20 the mount 20 of the invention includes a plurality of slots 160–163 arranged in parallel, spaced apart columnar format aligned generally to receive the circuit boards 18 of jacks 10 as they are inserted into the mount 20. A plurality of bores 200–211 are located in the slots. These bores 200–211 are arranged in such a fashion as to form two parallel lines, and each bore is spaced in an alternate position from the bore opposite it as best seen in FIG. 3. As seen in FIG. 4, within each bore is disposed an electric contact 220–231. As seen in FIG. 4, each electric contact has an associated wire wrap termination pin 240 and a spring contact 241. The wire wrap termination pin 240 extends away from the slots 160–163 and jack 10, while the spring contact 241 is ordinarily disposed in the slot. Each spring contact 241 of each electric contact 220–231 extends beyond half the distance across any slot. The arrangement of the bores 200–211 provides for an arrangement of electric contacts 220–231 where no individual spring contact is in electrical communication with any other spring contact in the mount. A plurality of mounts can be placed in an equipment rack.

Spring contacts 241 are deformable, i.e. pushed back upon insertion of jack 10 into mount 20. In the preferred embodiment, spring contacts 241 can extend beyond the halfway point of any of slots 160–165. To generate sufficient contact force spring contacts 241 extend a predetermined amount beyond a plane defined by circuit board 18 of jack 10. In the preferred embodiment extension beyond the halfway point across the slot allows the spring contact to develop sufficient contact force on circuit board 18 of jack 10. In the preferred embodiment if contact points 140–145 and 150–155 were not staggered, the spring contacts would touch. By staggering the contact points, the spring contacts do not contact each other. Certain applications may utilize a circuit board of sufficient thickness such that the spring contacts may not necessarily extend beyond the halfway point across a slot.

Attached to the wire wrap termination pins of each electric contact associated with any given slot are seven wires (not shown) carrying common DSX signals. These DSX signals include: a tip in; a tip out; a ring in; a ring out; a sleeve ground, a LED ground, and an energized source. These are well known in the art, and described in commonly assigned U.S. Pat. No. 4,840,568. The IN and OUT cross connect signals are also received from the electric contacts in the mount. The remaining contacts in the mount correspond to signals which can be used for other well known signal enhancement functions.

The circuitry connected to the contact points on the circuit board include resistors and other circuit elements to provide well known DSX functions. The DSX circuitry of the present invention is similar to that shown in commonly assigned U.S. Pat. No. 4,840,568. The cross connect circuitry of the present invention is accessible from the electric contact points disposed on the circuit board. When the jack is inserted into the mount the electric contact points located on the circuit board come in contact with the electric contacts disposed in the associated slot on the mount.

Benefits of maintaining all of the wire wrap terminations pins on the mount, behind the jack, are that the jack may be removed from the mount without disconnecting the hard wired cross connect signals from the jack, as would be necessary in the jack of commonly assigned U.S. Pat. No. 4,840,568. Also by maintaining all of the wires on the mount keep the entire system more orderly.

Further benefits of staggering or alternating the contacts is a greater density of wires in an equipment rack. By providing this benefit, more applications become available. Additionally staggering the contact points allows the spring contacts to extend over half way across any of the slots of the mount so that when the jack is inserted into the mount sufficient contact force may be generated.

While the foregoing detailed description of the present invention describes the invention in a preferred embodiment, it will be appreciated that it is the intent of the invention to include all modifications and equivalent designs. Accordingly, the scope of the present invention is intended to be limited only by the claims which are appended hereto.

We claim:

1. A jack assembly comprising:
   a) a jack having
      i) a circuit board having a first side and a second side separated by a first transverse dimension, said circuit board further having a front end and a rear end;
      ii) a dielectric body secured to said front end of said circuit board with said body extending from said circuit board in generally planar alignment, said body having a front face on a side of said body opposite said circuit board, said front face including a port formed therethrough to pass a plug into an interior of said body, a plurality of jack springs disposed within said body and positioned to releasably engage a plug inserted into said port, said jack springs each in electrical contact with individual ones of a plurality of contact points on said circuit board;
      iii) a first and a second plurality of electrical contact pads disposed and exposed on said first and said second sides, respectively, of said circuit board, said pads on said first side positioned offset from said pads on said second side with respect to said first transverse dimension, said pads of said first and second sides electrically connected to said plurality of contact points;
   b) a mount having a dielectric body with a slot formed therein and sized to receive said rear end of said circuit board, a first and a second plurality of exposed contact springs disposed within said slot witch said first plurality of contact springs disposed on a first side of said slot and with said second plurality of contact springs disposed on a second side of said slot, said first and second plurality of contact springs mutually offset to engage in electrical contact said first and second plurality of contact pads, respectively, when said circuit board is received within said slot so that when said jack is inserted into said mount, each of said contact points is in electrical communication with a discrete contact member of said contact members on said mount.

2. A jack assembly according to claim 1, wherein each of said contact springs of said mount are in electrical communication with a wire termination member.

3. A jack assembly according to claim 1 wherein each of said contact springs are, in the absence of said circuit board within said slot, in a rest state positioned beyond a midpoint of a transverse dimension of said slot.

* * * * *